July 5, 1960  H. C. REID  2,943,518
VARIABLE GEAR UNITS FOR USE IN MOTOR VEHICLES
Filed June 3, 1957  4 Sheets-Sheet 2
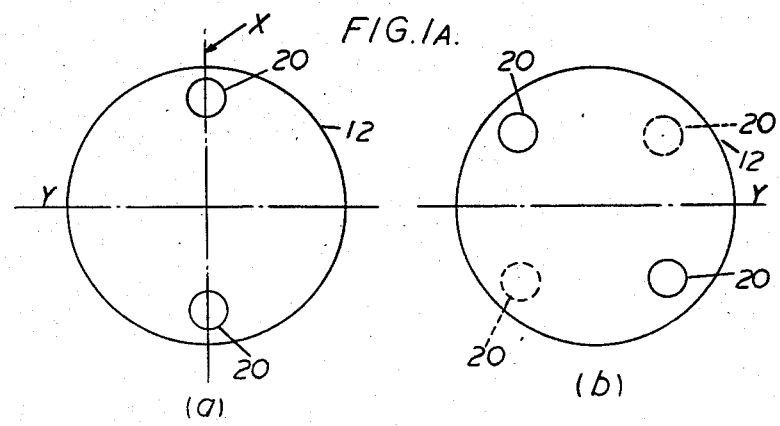
FIG. IA.
(a)  (b)
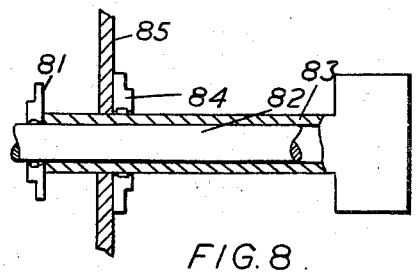
FIG. 5.
FIG. 8.
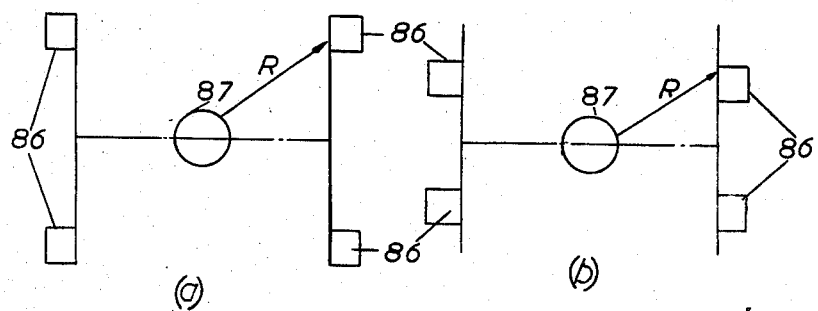
(a)  (b)
Inventor
HUGH CECIL REID
By Irwin S. Thompson
Attorney July 5, 1960  H. C. REID  2,943,518
VARIABLE GEAR UNITS FOR USE IN MOTOR VEHICLES
Filed June 3, 1957  4 Sheets-Sheet 3

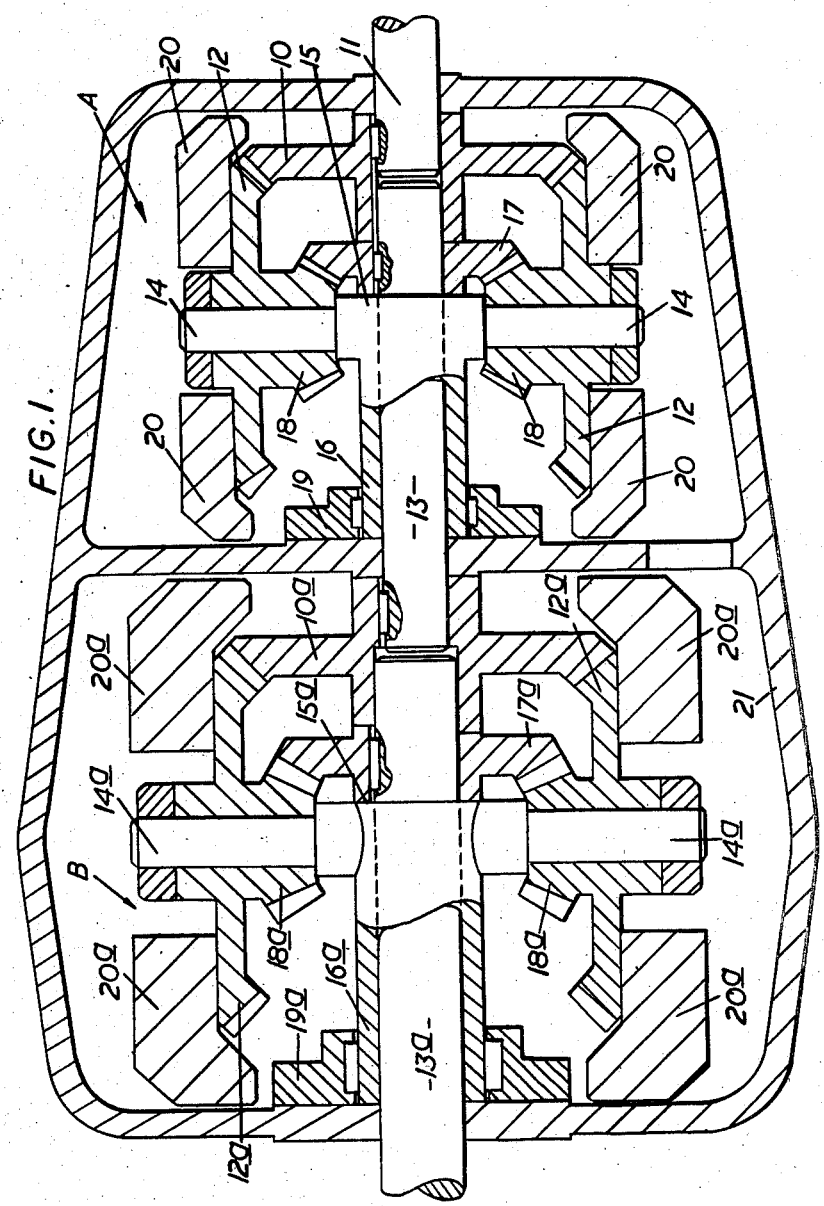

Inventor
HUGH CECIL REID

By Irwin S. Thompson
Attorney

July 5, 1960  H. C. REID  2,943,518
VARIABLE GEAR UNITS FOR USE IN MOTOR VEHICLES
Filed June 3, 1957  4 Sheets-Sheet 4

Inventor
HUGH CECIL REID
By Irvin S. Thompson
Attorney

United States Patent Office 2,943,518
Patented July 5, 1960

2,943,518
VARIABLE GEAR UNITS FOR USE IN MOTOR VEHICLES

Hugh Cecil Reid, 147 Malone Road, Belfast, Northern Ireland

Filed June 3, 1957, Ser. No. 663,259

Claims priority, application Great Britain June 9, 1956

25 Claims. (Cl. 74—751)

This invention relates to variable gear units for use in motor vehicles.

According to the present invention I provide in or for a motor vehicle a variable gear unit comprising co-axial driving and driven shafts, a gear wheel on each shaft, between said gear wheels gearing carried by a cage or other carrier rotatable co-axially with the shafts and held against counter rotation, the arrangement being such that, under different shaft loading and speed conditions, lower or higher gear ratios may be obtained respectively by virtue of said gearing being driven while the cage does not rotate or revolving with the cage about the axis of the said shafts, and said unit incorporating weight means adapted to be driven by said gearing in the lower gear ratio about an axis perpendicular to said shafts and to revolve with said gearing and cage about the axis of the shafts in the higher gear ratio, and by means of which said conditions may be predetermined.

Also according to the present invention I provide in or for a motor vehicle a variable gear unit comprising co-axial driving and driven shafts, a gear wheel on each shaft, between said gear wheels gearing carried by a cage or other carrier rotatable co-axially with the shafts and held against counter rotation, the arrangement being such that under different shaft loading and speed conditions low or high gear ratios respectively may be obtained by virtue of the said gearing being driven about an axis perpendicular to the shafts or revolving about the axis of the shafts, and said unit incorporating weight means driven around said perpendicular axis by said gearing in the low gear ratio and revolving with said gearing about the axis of the shafts in the high gear ratio, and by means of which said conditions may be predetermined.

Embodiment of the present invention will now be described, by way of example, with reference to the accompanying drawings, in which:

Fig. 1 is a diagrammatic view of a single variable gear unit embodying two basic units according to the present invention;

Fig. 1A is a diagrammatic plan view showing the positions between which the weight means vary when the cage is revolving;

Fig. 5 is a fragmentary diagrammatic view of a basic gear unit including provision for tow starting and over-run braking;

Fig. 8 is a diagrammatic view corresponding substantially to Fig. 1A and illustrating generally the principle of the invention.

Figure 2:
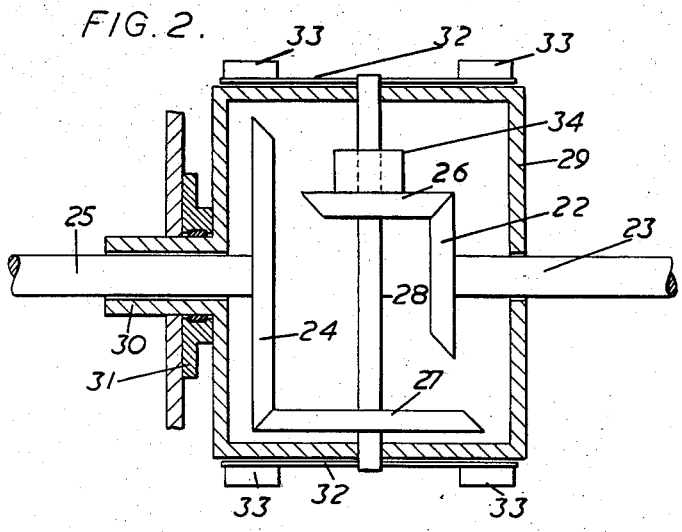
Fig. 2 is a diagrammatic view of a modified basic variable gear unit.

Referring to Fig. 1 of the drawings, there are shown two basic variable gear units A and B in accordance with the present invention conjoined to form a single, three speed gear unit. The gear unit A consists of a crown wheel 10 on a driving shaft 11 meshing with two pinion wheels 12 located on opposite sides of a driven shaft 13 which is co-axial with the driving shaft 11. The shafts 14 of the pinion wheels 12 are perpendicular to the driving and driven shafts 11 and 13 and are carried by a cage 15. The cage 15 is fixed to a hollow shaft or bush 16 through which the driven shaft 13 passes. The inner end of the driven shaft 13 has fixed thereto a bevel wheel 17 which meshes with two other bevel wheels 18, each one integral with one of the pinion wheels 12. The hollow shaft 16 is fixed at its outer end to a free wheel or other reaction member 19 which is arranged to permit rotation of the cage 15 with the driving and driven shafts 11 and 13 and to prevent counter rotation thereof due to torque reaction. Considering then the gear unit A alone, and dependent on shaft loading and speed conditions, the cage 15 rotates with the crown wheel 10 to form a solid connection between the driving and driven shafts 11 and 13, or it does not rotate and the pinion wheels 12 are driven about their own axis driving the bevel wheels 18 and 17 to effect a gear reduction between the driving and driven shafts 11 and 13, said shafts being driven in the same direction.

The cage 15 of gear unit A also carries weights 20 mounted, in the present embodiment, on each pinion wheel 12. There are, in fact, two weights 20 fixed on each pinion wheel 12, the weights 20 being diametrally opposed at equal radii to the shaft 14. The weights 20 revolve about the axis of the pinions 12 when the latter are driven, or revolve around the axis of the driving and driven shafts 11 and 13 when the cage 15 rotates. The mass of the weights 20 and the radius at which they revolve are selected to predetermine by centrifugal force or control the desired characteristics of the unit so that the gears change down automatically and change up semi-automatically substantially under load and speed conditions at which gear changes would be effected by a manual control in a conventional gear box.

Gear unit A is, therefore, a two-speed gear in which automatic or semi-automatic gear changing is effected by means of rotatable weights 20 associated with the planet pinion wheels 12 in such a way that the carrier or cage 15 may be held against backward rotation or may be allowed to rotate in a forward direction without rotation of the pinion wheels 12 about their axis, thereby to give two different driving speed ratios. The gear wheels 10 and 17 of the gear are yieldably coupled by centrifugal forces exerted by the weights 20 which rotate with the pinion wheels 12 so as to resist rotation of the pinion wheels 12 about their axis until such forces are overcome by the difference of torque between the gear wheels 10 and 17. When this takes place, the centrifugal forces diminish to zero until the cage 15 tends to rotate backwardly, but is prevented from doing so by the reaction member 19 or other one-way friction or other ratchet. The gear wheel 10 then drives the gear wheel 17 at a reduced speed through the pinion wheels 12 with which the weights 20 rotate without exerting any resistance due to centrifugal force.

When the carrier or cage 15 is rotating, the weights 20 are so subjected to centrifugal force that they tend to move into the transverse plane (see Fig. 1A diagram *a*) and resist strongly any forces tending to move them out of this plane, thus providing a solid direct drive. The carrier or cage 15 then rotates with the driving and driven elements giving the higher speed ratio.

When the driving torque becomes insufficient to overcome the resisting torque, the weights 20 are moved forcibly by the resisting torque in opposition to centrifugal force towards the position in which they are parallel to the axis of the driving and driven shafts 11 and 13 of the gear (see Fig. 1A diagram b). During the changing period, the influence of the centrifugal forces in resisting rotation of the pinion wheels 12 diminishes to zero, which occurs approximately when the weights 20 are in position (b). The cage 15 is then held by the reaction member 19 against rotation oppositely to the driving shaft, and the lower speed ratio between the driving and driven shafts is in operation. The weights 20 then rotate freely with the pinion wheels 12 and the gear functions as a simple reduction gear. This downward change is effected automatically.

The change of gear upwardly is brought about semi-automatically by retardation of the elements, such retardation resulting, for example, from the momentary closing of the throttle or otherwise.

The transmission gear, particularly when applied to a motor car, possesses advantages over other types of gearing and even epicyclic gears. As an example, a change of gearing is brought about without shock or without slippage of friction clutches or braking elements. The changing down from the higher to the lower gear ratio is effected automatically. The changing up calls only for a momentary interruption of the drive such as would be brought about by momentary release of the accelerator pedal. The mechanism, when applied to a simple bevel mechanism with driving and driven bevel wheels and one or more planetary bevel pinions, possesses the advantage of extreme simplicity. Further, the gearing almost completely eliminates transmission losses.

Still referring to gear unit A, in use of this unit when the driving shaft 11 starts to drive, the crown wheel 10 drives the pinion wheels 12 about their own axis and the driven shaft 13 is geared down as aforesaid. The cage 15 does not rotate and cannot rotate to give the higher gear ratio automatically due to the free wheel or reaction member 19 resisting torque reaction. The cage 15 is caused to rotate by the driver operating the accelerator or engine throttle pedal to close or partially close the throttle in order to reverse the torque on the cage 15 momentarily. That is to say, the speed of the driven shaft 13 has been increased to at least the speed at which a change down or "break down" would take place by increasing the engine speed, and the torque is reversed by momentarily closing the throttle. The torque reversal results in a slowing down of the speed of revolution of the weights 20 about the axis perpendicular to the driving and driven shafts 11 and 13 and, at the same time in the speeding up of the cage 15 to the same speed as the driving and driven shafts 11 and 13, and, in effect, a solid connection is formed therebetween giving a one-to-one ratio between said shafts, centrifugal force preventing the weights 20 from revolving about said perpendicular axis. When the throttle is closed or partially closed the vehicle, previously driven by the engine is now propelled by the momentum stored in the vehicle which now in effect drives the engine to give the aforesaid torque reversal.

It is to be noted that the action of momentarily closing the throttle may alternatively be effected automatically by an electrical, centrifugal or other device, controlled by speed and load conditions.

When the cage 15 rotates with the driving and driven shafts 11 and 13, the weights 20 revolve around the axis of said shafts, and dependent upon shaft loading and speed conditions their positions may vary between one in which the two pairs of weights 20 are aligned and revolve in substantially a common vertical plane and one in which the weights of one pair are aligned at right angles to the weights of the other pair and the weights in each pair are aligned at 45° to the axis of the driving and driven shafts 11 and 13, or apporixmately so. This is shown diagrammatically in Fig. 1A. The higher gear position is shown in diagram (a), the weights 20 of the lower pinion wheel (not shown) being disposed directly beneath the weights 20 shown and all the weights 20 revolving in the common vertical plane X.

In diagram (b) which shows the position in which there is about to be a change down, the weights 20 of the upper pinion 12 are shown in full lines and the weights of the lower pinion are shown in dotted lines, that is, the weights of each pinion are at right angles to those of the other and are aligned at 45° to the axis Y of the driving and driven shafts. The weights 20 revolve in the said substantially vertical plane at high shaft speeds and low torque and they move out of this plane towards their said 45° inclination in accordance with increase in load on the driven shaft and reduction of the speed of rotation of the cage 15. When the load on the driven shaft 13 is so high that the weights 20 are inclined at 45° or thereabouts to the shafts 11 and 13, this degree of inclination is critical and any further loading of the driven shaft 13 causes the weights 20 to move beyond said inclination in the direction of alignment with the shafts 11 and 13 and to lose their resistance to rotation so that they become driven around their own axis as hereinbefore described and the cage 15 stops revolving, and a gear reduction is thus automatically effected. As aforesaid, 45° is believed to be the critical inclination beyond which a change down take place, but it is possible that this may vary to some degree.

It will clearly be seen that a basic gear unit, such as A, in accordance with the present invention gives two gear ratios and one gear reduction stage.

The gear unit B is substantially identical to gear unit A and parts therein corresponding to parts in gear unit A are referred to by the same reference numerals with the index letter a. In gear unit B the crown wheel 10a is fast on the driven shaft 13 of the gear unit A, and the weights 20a are of a greater mass and arranged at a greater radius from the axis of their pinion wheels than are the weights 20 of the gear unit A. The operation of the gear unit B is the same as that of gear unit A hereinbefore described.

The single gear unit, therefore, gives three different gear ratios and two gear reduction stages. The gear units A and B are suitably disposed in a casing 21.

Due to the fact that the weights 20a are heavier than the weights 20 and are disposed at a greater radius from their axis, the gear unit A always "breaks down" before the gear unit B. The same effect will be obtained if the weights 20a are simply heavier or at a greater radius than the weights 20.

It will be appreciated that more than two basic gear units may be conjoined to give more than three gear ratios and two gear reduction stages.

The weights 20 and 20a may be kept as small as possible by effecting the reduction in gear ratio through the bevel gears 17, 18 and 17a, 18a rather than through the crown and pinion wheels 10, 10a and 12, 12a, and/or the diameter between the weights of each pair may be increased.

When two or more basic gear units are provided to give two or more gear reduction stages or cages in addition to a one-to-one gear ratio, the single unit consisting of the two or more basic gear units, for example units A and B (Fig. 1) is arranged so that upward changes are effected by bringing the cage giving the final reduction up to the same speed as the driving and driven shafts first, followed by causing the same thing to happen to successive gear reduction cages. This means that weights may be heavier or their radius greater or the reduction obtained in such a manner as to speed up the weights around their perpendicular axis and so give them more leverage over the torque they have to resist, or a combination of these requirements. This is due to the fact that the final cage in the train carries the greatest torque.

It is to be noted that gear reductions are obtained by multiplying the successive gear reductions together.

The single variable gear unit shown in Fig. 1 is suitable for incorporation in a motor car, whereof the maximum output of the engine shaft is 74 lbs. ft. at 2100 r.p.m., and each weight 20 of the unit A which is disposed nearer to the engine than the unit B is 0.6 lb. at a pitch radius of 1⅝ inches, while each weight 20a is 1.6 lb. at a pitch radius of 2⅛ inches. In unit A the gear ratio is 1.6 to 1 and in unit B 2 to 1 giving thus an overall gear ratio of 3.2 to 1.

Reference is now made to Fig. 2 of the drawings. In this modified basic gear unit a bevel gear 22 is fast on the driving shaft 23 and a larger bevel gear 24 is fast on the driven shaft 25 which is co-axial with but spaced from the driving shaft 23. The bevel gears 22 and 24 mesh respectively with bevel gears 26 and 27 carried by a solid shaft 28 perpendicular to the driving and driven shafts 23 and 25 and carried by a cage 29 which is fixed to a hollow shaft or bush 30 through which the driven shaft 25 passes. The hollow shaft 30 is fixed at its outer end to a free wheel or other reaction member 31 as aforesaid. The ends of the shaft 28 project beyond the cage 29 and each mounts a disc 32 carrying a pair of weights 33. A counterweight 34 is provided to balance bevel wheel 27. The gear reduction is effected by the bevel gears 24 and 27. This unit may be modified by dispensing with the discs 32 and weights 33 and by providing instead on the shaft 28 a single disc carrying weights, the disc lying in the plane of the driving and driven shafts 23 and 25.

The basic variable gear unit shown in Fig. 2 and the modification thereof operate in accordance with the method of operation of the basic gear unit A described above with reference to Fig. 1 of the drawings. It will be appreciated that two or more units as described with reference to Fig. 2 (or its modification) may be conjoined to form a gear train as aforesaid.

Figure 3:
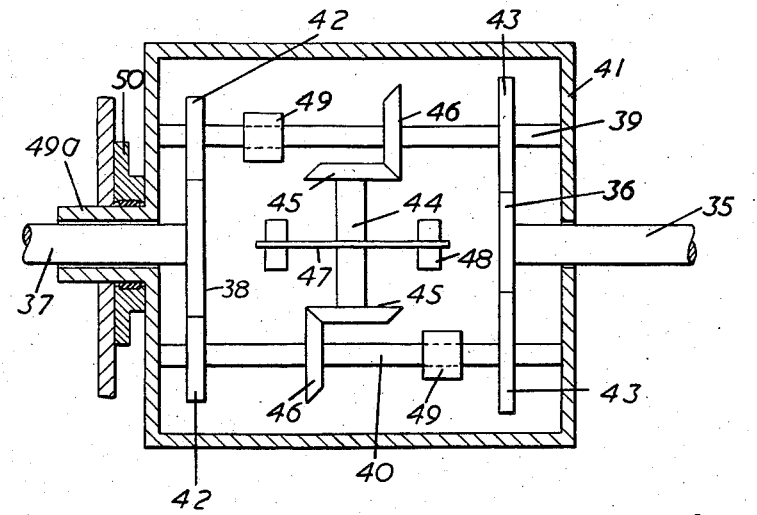
Fig. 3 is a diagrammatic view of another modified basic variable gear unit.

A further alternative basic variable gear unit is shown in Fig. 3 of the drawings. This gear unit comprises a driving shaft 35 mounting a sun wheel 36 and a driven shaft 37 mounting a larger sun wheel 38. Two shafts 39 and 40 carried by a cage 41 lie parallel to the driving and driven shafts 35 and 37 and are located on opposite sides thereof and the sun wheels 36 and 38 mesh respectively with planet gear wheels 42 and 43 carried by said parallel shafts 39 and 40. A cross shaft 44 also carried by the cage 41 and perpendicular to the driving and driven shafts 35 and 37 carries two bevel gear wheels 45 one on each side of the latter. One of the bevel gears 45 meshes with the bevel gear 46 on parallel shaft 39 while the other bevel gear 45 meshes with a similar bevel gear 46 on parallel shaft 40. The cross shaft 44 carries a disc 47 mounting a pair of weights 48, and the disc 47 lies in the plane of the driving and driven shafts 35 and 37. Counterweights 49 are provided on the parallel shafts 39 and 40 to prevent or reduce any couple being sent up by the bevel gear wheels. The cage 41 is fixed to a hollow shaft or bush 49a through which the driven shaft 37 passes. The hollow shaft 49a is fixed to a free wheel or other reaction member 50 as aforesaid.

The operation of this basic unit is in accordance with that of basic unit A (Fig. 1) but in this case, the actual load is carried by the gear wheels 42 and 43, the bevel wheels 45 and 46 serving only to rotate the disc 47 and weights 48. In a modified form of this basic gear unit the shaft 44 is replaced by two shafts each mounted on the cage 41 and carrying one of the bevel gears 46 meshing with one of the bevel gears 45 at that side of the corresponding shaft 39 or 40 remote from the crown wheels 36 and 38 or centre line. Each of the two shafts moreover, mounts outside the cage a disc carrying a pair of weights.

The coupling provided between the engine crankshaft and the driving shaft of each of the above described variable gear units, when incorporated in a motor vehicle, may be in the form of a manually operated clutch, an automatic and centrifugally acting clutch outside the unit, an automatic clutch device incorporated in the free wheel or other reaction device of one of the cages, or a fluid coupling such as a fluid flywheel, torque converter, converter coupling or the like.

In a variable gear unit as shown for example in Fig. 1, there may be provided a device controlled by a manually operable lever to retard temporarily the speed of rotation of the cage of the first gear reduction unit (basic unit A) to effect a change to a lower gear at speeds at which a change down would not otherwise take place automatically. This device could be used to effect a braking action, by making use of engine braking an overrun with the lower gear ratio engaged, to provide increased torque for overtaking, or to hold the transmission in an intermediate gear, when desired.

Figure 4:
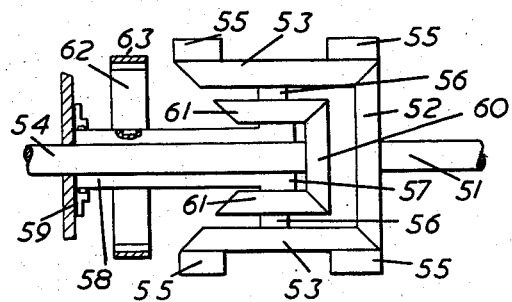
Fig. 4 is a diagrammatic view of a basic variable gear unit including means for effecting changing down of the gear ratio when conditions are such that the change down will not occur automatically.

Such an arrangement is shown in Fig. 4 which illustrates the basic unit of a multi-unit gear transmission nearer or nearest to the engine. This basic unit corresponds substantially to basic unit A described with reference to Fig. 1. It consists of a driving shaft 51, a crown wheel 52 fast on the driving shaft 51 and meshing with two pinion wheels 53 located on opposite sides of a driven shaft 54 co-axial with the driving shaft 51. Each pinion wheel 53 carries as aforesaid a pair of weights 55. The shafts 56 of the pinion wheels 53 are perpendicular to the driving and driven shafts 51 and 54 and are carried by a cage 57. The cage 57 is fixed to a hollow shaft or bush 58 through which the driven shaft 54 passes and to which is fixed at its outer end a free wheel or other reaction member 59, as aforesaid.

The inner end of the driven shaft 54 has fixed thereto a bevel wheel 60 which meshes with two other bevel wheels 61, each carried by a shaft 56. A brake drum or other suitable member 62 is fixed on the hollow shaft 58 and has arranged therearound a brake band 63 adapted to be moved into frictional contact with the drum 62 through the intermediary of a suitable linkage on actuation by the driver of a manually operable lever (not shown). This brake might alternatively be a disc brake controlled by electrical or other appropriate means when the accelerator pedal is fully depressed, i.e. a "kickdown."

With the brake drum and band 62 and 63 in spaced relationship it will be clear that the unit operates in accordance with the unit A of Fig. 1. When, however, the transmission of which the unit (Fig. 4) forms part is running in one-to-one ratio and it is desired to change to a lower gear ratio and the conditions are such that the change down will not take place automatically, it will be appreciated that such change down can be effected by the driver if he actuates the lever to bring the brake band 63 into engagement with the brake drum 62 to arrest the rotary movement of same and consequently the hollow shaft 58 and cage 57.

While this lever may be employed to actuate the brake, its main function would be the selection of neutral, forward or reverse gear, a further movement of the lever perhaps beyond forward gear position causing the lever to actuate the brake. Neutral may be obtained by "undoging" for example by means of said lever the free wheel or other reaction member, holding the cage against counter-rotation. With the free wheel "undoged," reverse drive may be obtained, for example, by bringing into operataion or into mesh by means of said lever two gear wheels fixed to a counter shaft respectively with a gear wheel on the cage and another on the driven shaft so that counter-rotation of the cage effects reversal of the driven shaft. Alternatively, bevel gearing or any other suitable means may be employed to give the reverse drive.

Provision is also made for tow starting of the engine and over-run braking, or, in other words, driving from the driven shaft to the driving shaft. This is effected (see Fig. 5) by providing in a basic variable gear unit, such as for example as unit A of Fig. 1 a free wheel device 81 between the driven shaft 82 and cage shaft 83, in addition to the free wheel or other reaction member 84 between the cage shaft 83 and casing 85 of the unit. The free wheel device 81 prevents the cage from running faster than the shaft 82 in the direction of drive which would otherwise occur when the drive is from the rear. Alternatively, the free wheel device 81 may be disposed between the crown wheels on the driving and driven shafts to prevent the latter running faster than the former.

Figure 6:
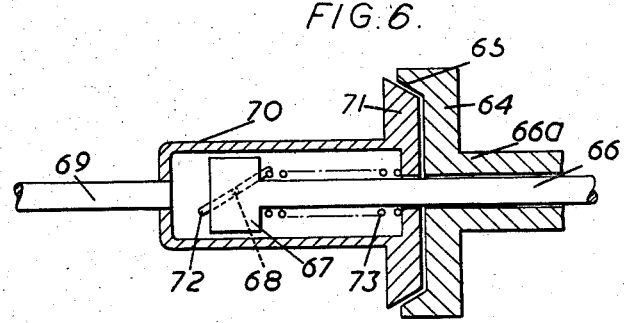
Fig. 6 is a fragmentary, diagrammatic view of a basic gear unit including means for speeding up gear ratio change up.
Figure 7:
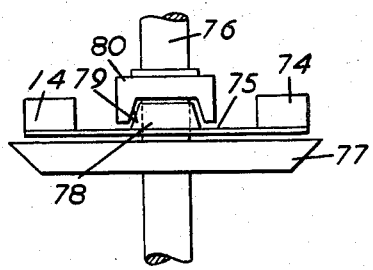
Fig. 7 is a fragmentary, diagrammatic view of a basic gear unit including alternative means for speeding up gear ratio change up.

Reference is now made to Fig. 6 of the drawings which shows a fragmentary detail view of a basic variable gear unit, such as unit A of Fig. 1, provided with means for speeding up the change from a lower gear ratio to a higher gear ratio, or, in other words, to expedite rotation of the cage with the driving and driven shafts to give a one-to-one gear ratio. Such means may comprise a cam-operated clutch provided between the driven shaft and cage. In the arrangement shown in Fig. 6, the clutch is a cone clutch and part of the cage 64 is formed with a conical recess formation 65. The driven shaft comprises a part 66 driven from the driving shaft (not shown) and passing through a hollow shaft 66a of which the cage 64 is part, said part 66 having a head 67 carrying a spud 68, and a part 69 including a chamber 70 into which the head 67 and spud 68 project and a clutch cone member 71 integral with the chamber 70 and adapted for engagement in the recess 65, the wall of the chamber 70 being formed with an angularly-disposed cam slot 72 into which the spud 68 projects. A spring 73 is disposed between said head 67 and one wall of the chamber 70.

The method of operation of the above described arrangement will be clear. When there is a load and the unit is at the lower gear ratio the clutch cone member 71 is spaced from the conical recess 65 due to the load acting on the spud 68 in the cam slot 72. Immediately, however, there is torque reversal the cone member 71 engages in the recess 65 due to inter-action of the cam slot 72 and spud 68 and the speed of rotation of the cage 64 is immediately brought up to that of the shaft. The spring 73 assists in the engagement of the clutch parts 65 and 71 if necessary. The clutch device may alternatively be centrifugally controlled. The cam slot and spud may be replaced by spiral splining. Alternatively, means for automatically braking the intermediate shaft between two conjoined basic units may be provided to speed up the change up of the unit remote from the engine.

In the embodiment of the invention described with reference to Fig. 1, the clutch device (Fig. 5) may be used in one or other gear unit or both. While, however, the use of such a clutch device in a unit would permit tow-starting and over-run braking, it would preclude manually controlled retarding of the cage of that unit for the purpose aforesaid, and therefore in a preferred arrangement, the clutch device is provided only in the second unit (unit B of Fig. 1) between the tail shaft 13a and the cage 15a, and the free wheel device last above referred to is provided in the second unit. If there are three or more basic variable speed gear units conjoined to form a transmission for a motor driven vehicle, the brake as described with reference to Fig. 4 would be embodied in the final basic unit, while the other basic units would embody free wheel devices as described with reference to Fig. 5 of the drawings.

In a further alternative arrangement (Fig. 6) for speeding up the change from a lower gear ratio to a higher gear ratio, the weights 74 are carried by a member or disc 75 slidable along the neck or boss of a pinion wheel 77 with which the crown wheel (not shown) of the driving shaft (also not shown) meshes. The neck of the pinion wheel 77 and the bore of the member or disc 75 are splined to permit relative sliding movement but prevent relative angular movement. The disc 75 carries a clutch cone member 78 adapted for engagement in the conical recess 79 of a clutch member 80 fixed to the shaft 76. The clutch members 78 and 80 are engaged, as will be clear, by centrifugal force acting on each member or disc 75 and the weights 74 as the cage (not shown) rotates around the driving and driven shafts (not shown) and more quickly slow down rotation of the disc 75, around its own axis. As the disc 75 is slidably splined to the pinion wheel 77, the latter is slowed down along with the disc 75 and this has the effect of speeding up the cage to the same speed as the driving and driven shafts. A spring (not shown) is preferably provided between the clutch member 78 and 80, to maintain them in spaced relationship when the unit is in the lower gear ratio. It is preferred, when this arrangement is used not to mount the weights directly on the pinion wheels as they must not be moved out of mesh with the driving shaft crown wheel.

A single basic variable gear unit, such for example as unit A of Fig. 1, may be employed as an overdrive unit. The driving shaft of the basic unit is coupled to the output shaft of a conventional transmission gear box and the driven shaft of the basic unit coupled to the propeller shaft. The free wheel or other reaction member of the unit is adapted automatically to be "undoged" by, for example, an electrically-energised solenoid when the conventional gear box is put into reverse gear to give a reverse drive in the overdrive unit. A further free wheel device such as shown and described with reference to Fig. 5 is also provided to permit as aforesaid tow-starting and over-run braking and to enable the assembly to be driven in reverse.

Fig. 8 of the drawings shows diagrammatically the position of the weights 86 when the cage (not shown) is revolving at high shaft speeds and low torque-diagram (a)—, and when torque is increased and speed is reduced, both to predetermined values, and a change down is about to be effected—diagram (b). It will be noted that the radius R of the weights 86 from the driven shaft 87 decreases as they move from position (a) to position (b). These diagrams correspond to the diagrams shown in Fig. 1.

Various modifications may be made without departing from the scope of the invention. For example, it is possible that the weight means on each disc or gear wheel may be in the form of one eccentrically located weight or a single bar weight extending diametrally thereof.

As a result of the present invention there is provided a variable gear unit having a predetermined number of different gear ratios of which the operation is fully automatic for downward gear changing and is automatic or semi-automatic for upward gear changing, and in which the conditions under which gear changing takes place may be predetermined. The unit is also of compact and simple construction and in one arrangement provides free wheeling at low speeds but not at high speeds.

It is to be understood that the invention is not limited to use in motor road vehicles, but may equally well be applied to motor driven railway vehicles.

I claim:

1. A variable gear unit comprising coaxial driving and driven shafts, a gear fixed on each of said shafts, a carrier rotatable coaxially with said shafts, means permitting said carrier to rotate and holding said carrier against counter rotation, gear means carried by said carrier with the axis thereof perpendicular to the axis of said shaft and operatively connecting said gears, and weight means carried by and rotatable with said gear means, said weight means being spaced from the axis of said gear means, whereby said weight means may rotate about the axis perpendicular to said shafts when said unit is in low gear and said weight means and cage may rotate about the axis of said shafts when said unit is in high gear.

2. A variable gear unit as claimed in claim 1, in which the weight means effects the changing of the drive ratio of said unit to a lower ratio.

3. A variable gear unit as claimed in claim 1, in which the weight means, when the carrier rotates around the driving and driven shafts, is adapted to vary, depending upon shaft loading and speed conditions, between a position in which the weight means revolves in a substantially vertical plane and a position in which the weight means is aligned at 45° or thereabouts to the axis of the driving and driven shafts.

4. A variable gear unit as claimed in claim 1, in which there are two sets of weight means, one disposed on each side of the axis of the driving and driven shafts, and the sets are adapted to vary between a position in which the sets are aligned and revolve in substantially a common plane perpendicular to said shafts, and a position in which the sets are aligned at right angles to one another and each set is aligned at 45° or thereabouts to the axis of the driving and driven shafts.

5. A variable gear unit as claimed in claim 4, in which the degree of inclination of 45° or thereabouts is critical, and further loading of the driven shaft causes the weight means to move beyond said inclination in the direction of alignment with said shaft and lose its resistance in rotation, whereby the weight means is driven around said perpendicular axis and a change down to the lower gear ratio is effected.

6. A variable gear unit as claimed in claim 1, including means adapted to effect a change to a lower gear ratio when conditions are such that the change will not occur automatically.

7. A variable gear unit as claimed in claim 6, in which said last-mentioned means comprises a brake adapted to act on the carrier, when rotating around the axis of the driving and driven shafts, to arrest said rotary movement and so effect the gear change down.

8. A variable gear unit as claimed in claim 1, comprising means for speeding up to change from a lower gear ratio to a higher gear ratio.

9. A variable gear unit as claimed in claim 8, in which said last-mentioned means comprises a clutch device between the driven shaft and the carrier and engaged on torque reversal or reduction, whereby the speed of rotation of the carrier is immediately brought up to that of the shaft.

10. A variable gear unit as claimed in claim 9, in which the clutch device is a spring-loaded cone clutch which is cam actuable.

11. A variable gear unit as claimed in claim 8, in which said last-mentioned means comprises a clutch device disposed between the weight means and the perpendicular shaft about which the weight means revolve, the clutch device being engageable by centrifugal force as the carrier rotates to assist in slowing down rotation of the weight means about the perpendicular axis.

12. A variable gear unit as claimed in claim 1, comprising means adapted to permit selection of forward or reverse drive and neutral.

13. A variable gear unit as claimed in claim 1, comprising means permitting tow-starting of an engine to which the unit is coupled and over-run braking of the engine.

14. A variable gear unit as claimed in claim 13, in which said last-mentioned means is a free-wheel device provided between the driven shaft and carrier shaft.

15. A variable gear unit as claimed in claim 1 and adapted to be used as an overdrive unit.

16. A variable gear unit as claimed in claim 1, said gears being level gears and each meshing with at least one gear wheel, said one gear wheel being a part of the gear means, the shaft of said one gear wheel being perpendicular to the driving and driven shafts and mounted in the carrier.

17. A variable gear unit as claimed in claim 16, in which weight means is mounted on each of said gear wheels.

18. A variable gear unit as claimed in claim 1, said gear means comprising two shafts carried by the carrier and lying parallel to the driving and driven shafts and on opposite sides thereof, the gears on the driving and driven shafts meshing with gear wheels on each of the said parallel shafts, and a cross shaft also carried by the carrier perpendicular to the driving and driven shafts and carrying two bevel gear wheels one on each side of the latter and each meshing with a bevel gear wheel on the adjacent parallel shaft.

19. A variable gear unit as claimed in claim 18, in which counterweights are provided on the parallel shafts to prevent a couple being set up by the bevel gear wheels.

20. The combination of at least two variable gear units as claimed in claim 1, the units being coupled together to form a gear train.

21. The combination as claimed in claim 20, in which the weight means of each unit commencing from the output unit of the gear train has greater inertia than those of the immediately adjacent unit nearer the input unit so that the units change from high gear to low gear in turn from the input unit of the train.

22. A variable gear unit as claimed in claim 3 in which the degree of inclination of 45° or thereabouts is critical, and further loading of the driven shaft causes the weight means to move beyond said inclination in the direction of alignment with said shaft and lose its resistance in rotation, whereby the weight means is driven around said perpendicular axis and a change down to the lower gear ratio is effected.

23. A variable gear unit as claimed in claim 13 in which said last-mentioned means is a free-wheel device provided between two adjacent gear wheels on said shafts.

24. A two-speed epicyclic gear comprising a driving shaft, a driven shaft coaxial with the driving shaft, a gear wheel on each shaft and rotatable therewith, a planet carrier, planet gearing mounted on the planet carrier operatively connecting the gear wheels and rotatable to give a gear reduction ratio, the planet carrier also being rotatable in a plane perpendicular to the common axis of the driving and driven shafts, means for preventing the planet carrier from rotating oppositely to the driving shaft, and a pair of balanced diametrically-opposed weights associated with the planet gearing and rotatable about a transverse axis during the gear reduction, and being subjected, under certain shaft loading and speed conditions, to centrifugal forces which effect rotation of the planet carrier upon torque variation to give a solid direct drive between the driving and driven shafts, the pair of weights, during rotation of the planet carrier, being variable, depending upon shaft loading and speed conditions, between a position in which the pair of weights revolves in a substantially vertical plane and a position in which the pair of weights is aligned at 45° to the axis of the driving and driven shafts.

25. A two-speed epicyclic gear comprising a driving shaft, a driven shaft coaxial with the driving shaft, a gear wheel on each shaft and rotatable therewith, a planet carrier, planet gearing mounted on the planet carrier operatively connecting the gear wheels and rotatable to give a gear reduction ratio, the planet carrier also being rotatable in a plane perpendicular to the common axis of the driving and driven shafts, means for preventing the planet carrier from rotating oppositely to the driving shaft, and a pair of balanced, diametrically-opposed weights disposed on each side of the axis of the driving and driven shafts, and each pair being associated with the planet gearing and rotatable about a transverse axis during the gear reduction, and being subjected, under certain shaft loading and speed conditions, to centrifugal forces which effect rotation of the planet carrier upon torque variation to give a solid direct drive between the driving and driven shafts, the two pairs of weights, during rotation of the planet carrier, being variable, depending upon shaft loading and speed conditions, between a position in which the pairs are aligned and revolve in substantially a common plane perpendicular to said shafts, and a position in which the pairs are aligned at right angles to each other and each pair is aligned at 45° to the axis of the driving and driven shafts.

References Cited in the file of this patent

UNITED STATES PATENTS

| | | |
|---|---|---|
| 864,903 | Moore | Sept. 3, 1907 |
| 1,599,123 | Fay | Sept. 7, 1926 |
| 1,776,469 | Gardner | Sept. 23, 1930 |
| 1,805,612 | Chapman | May 19, 1931 |

FOREIGN PATENTS

| | | |
|---|---|---|
| 918,516 | France | Feb. 11, 1947 |
| 887,896 | France | Nov. 25, 1943 |